US012574377B2

(12) United States Patent
Ramesh et al.

(10) Patent No.: US 12,574,377 B2
(45) Date of Patent: Mar. 10, 2026

(54) EPHEMERAL GATEWAY FOR REMOTE ACCESS

(71) Applicant: Microsoft Technology Licensing, LLC, Redmond, WA (US)

(72) Inventors: Sriram Ramesh, Bothell, WA (US); Balaji R. Venkataraman, Redmond, WA (US); David Daniel Dickison, Maple Valley, WA (US); Francis Xavier Todd, II, Lynnwood, WA (US); Edwin Stewart, Seattle, WA (US); Srinivasulu Varkala, Sammamish, WA (US); Jonathan Michael Severy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 18/204,172

(22) Filed: May 31, 2023

(65) Prior Publication Data

US 2024/0406176 A1    Dec. 5, 2024

(51) Int. Cl.
   *H04L 9/40*        (2022.01)
(52) U.S. Cl.
   CPC ........ *H04L 63/101* (2013.01); *H04L 63/0272* (2013.01); *H04L 63/0823* (2013.01)
(58) Field of Classification Search
   CPC .............. H04L 63/101; H04L 63/0272; H04L 63/0823; H04L 63/0236; H04L 63/108
   See application file for complete search history.

(56) References Cited

U.S. PATENT DOCUMENTS

| | | | |
|---|---|---|---|
| 10,187,362 B1 * | 1/2019 | McClintock | ........ H04L 63/0272 |
| 11,909,731 B1 * | 2/2024 | Dayan | ................ H04L 63/0263 |
| 2005/0160290 A1 | 7/2005 | Moon | |
| 2008/0318548 A1 * | 12/2008 | Bravo | ................ H04L 63/0853 |
| | | | 455/411 |
| 2009/0216885 A1 * | 8/2009 | Brunswig | .............. G06Q 10/00 |
| | | | 709/227 |
| 2015/0188888 A1 | 7/2015 | Kang | |
| 2017/0339147 A1 * | 11/2017 | Wen | ......................... H04W 4/02 |
| 2021/0195416 A1 * | 6/2021 | Mese | .................. H04W 60/04 |
| 2022/0248072 A1 * | 8/2022 | Gupta | .................. H04L 63/0807 |
| 2022/0398116 A1 * | 12/2022 | Chen | ................... G06F 9/45558 |
| 2024/0012668 A1 * | 1/2024 | Parikh | ..................... G06F 3/067 |

OTHER PUBLICATIONS

"Deploy Azure Virtual Machine (Windows) and apply STIG", Retrieved from: https://github.com/Azure/ato-toolkit/tree/master/stig/windows, Retrieved Date: Feb. 24, 2023, 2 Pages.

(Continued)

*Primary Examiner* — Farid Homayounmehr
*Assistant Examiner* — Suman Debnath
(74) *Attorney, Agent, or Firm* — Schwegman Lundberg & Woessner, P.A.

(57)        ABSTRACT

A computer implemented method includes receiving a time window for allowing access to an asset in a local area network. An ephemeral gateway is instantiated to provide access to the asset during the time window. Time window limited access credentials are also identified and are required for a first remote user to access the ephemeral gateway to gain access to the asset only during the time window.

20 Claims, 6 Drawing Sheets

(56) References Cited

OTHER PUBLICATIONS

Baldwin, et al., "Authentication in Azure Key Vault", Retrieved from: https://learn.microsoft.com/en-us/azure/key-vault/general/authentication, Nov. 2, 2022, 4 Pages.

Jenkins, et al., "PowerSTIG", Retrieved from: https://github.com/Microsoft/PowerStig, Mar. 16, 2023, 7 Pages.

McGuire, et al., "Configure server settings for P2S Vpn Gateway connections—certificate authentication—Azure portal", Retrieved from: https://learn.microsoft.com/en-us/azure/vpn-gateway/vpn-gateway-howto-point-to-site-resource-manager-portal, Apr. 11, 2023, 22 Pages.

Roach, John, "Microsoft datacenter batteries to support growth of renewables on the power grid", Retrieved from: https://news.microsoft.com/source/features/sustainability/ireland-wind-farm-datacenter-ups/, Jul. 7, 2022, 10 Pages.

Vidich, et al., "Deploy STIG-compliant Windows Virtual Machines (Preview)", Retrieved from: https://learn.microsoft.com/en-us/azure/azure-government/documentation-government-stig-windows-vm, Mar. 22, 2023, 7 Pages.

International Search Report and Written Opinion received for PCT Application No. PCT/US2024/030154, Aug. 28, 2024, 10 pages.

International Preliminary Report on Patentability (Chapter I) received for PCT Application No. PCT/US2024/030154, mailed on Dec. 11, 2025, 07 pages.

* cited by examiner

EPHEMERAL GATEWAY FOR REMOTE ACCESS

BACKGROUND

Data centers can host data from multiple different customers. Providing remote customer access to a data center can create access points that can be exploited by bad actors to gain access to data of all the customers. There is a need for a better way of providing each customer access to their data in conjunction with reducing the risk of exposing data of other customers to bad actors.

SUMMARY

A computer implemented method includes receiving a time window for allowing access to an asset in a local area network. An ephemeral gateway is instantiated to provide access to the asset during the time window. Time window limited access credentials are also identified and are required for a first remote user to access the ephemeral gateway to gain access to the asset only during the time window.

DETAILED DESCRIPTION

Figure 1:
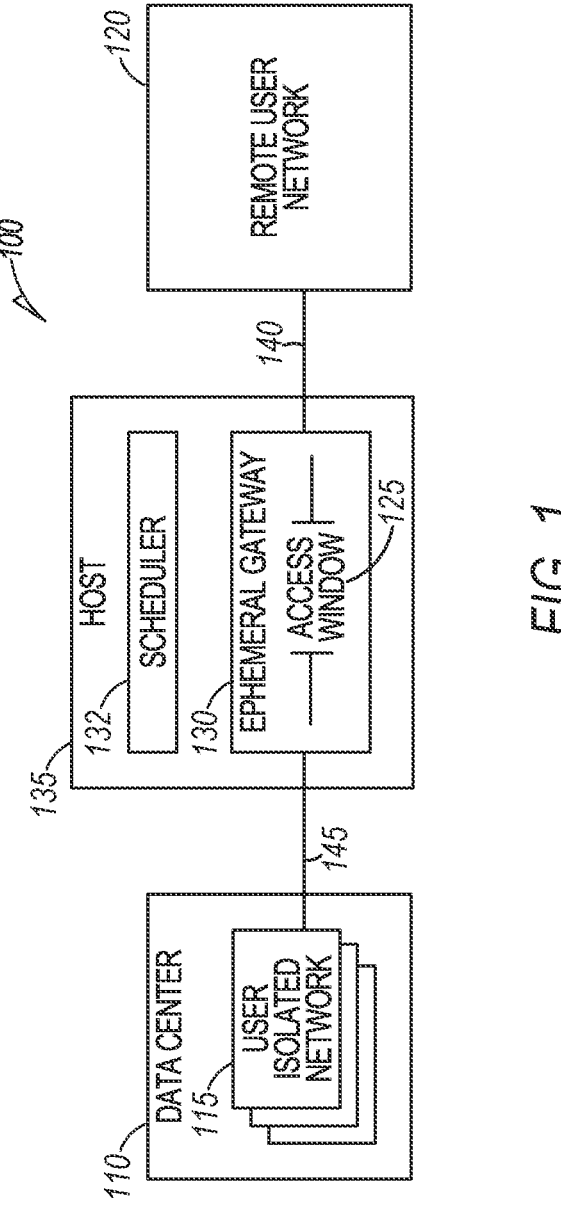
FIG. 1 is a block diagram illustrating a system for providing remote access to data in a secure manner according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Many users of cloud services access cloud resources with the use of user credentials, such as a user ID and a password. Bad actors may gain access to or otherwise derive such credentials, allowing them to access the user's cloud resources. Data centers may provide many cloud services, including services that include access to high value assets of multiple users, such as sensitive or critical information, devices, services, and programming. Simply protecting such high value assets with user credentials may allow bad actors to utilize nefariously obtained user credentials to access the data center and potentially utilize such credentials to obtain access to the user's high value assets as well as to the high value assets of other users.

An improved remote access method and system includes the ability to request access to cloud resources of a user during a specified time access window. An ephemeral gateway, such as a jump box, or other remote desktop server function may be set up or instantiated in response to the request to provide remote access to the user via the specified time window. In one example, processing to instantiate the ephemeral gateway may be commenced at a time prior to the beginning of the time window such that the ephemeral gateway is established and usable just prior to or at the beginning of the time window.

Remote access credentials may be generated that are valid only during the time window and used by the user to access the cloud resources via the ephemeral gateway. The term "ephemeral" is used to describe the gateway as being temporary and usable only during the specified time window.

Upon expiration of the time window, the ephemeral gateway is decommissioned along with the credentials. Each new time window may have different credentials generated such that credentials are not reused. Not reusing credentials further limits the ability of a hacker to continue efforts to access the assets. The credentials generated for the ephemeral gateway are also time limited in accordance with the specified time access window. This ensures that even if the credentials are compromised, the credentials will be rendered useless once the access window expires.

The ephemeral gateway may be used with further security monitoring services, such as Microsoft Defender™ for Endpoint and security monitoring systems for intrusion detection. Security logging and alerting may also be utilized, along with the use of virtual private network tunnels between the ephemeral gateway and a data center hosting the cloud resources. In further examples, network security groups or access control lists may be used to limit access to pre-specified IP (Internet Protocol) addresses.

The use of an ephemeral gateway, which is created only for the duration of the specified time access window, makes it difficult for attackers to gain a foothold in a data center hosing the cloud resources. Once the time slot is over, the ephemeral gateway box is deleted, removing any potential unauthorized access points and the corresponding ability to continue further attacks.

The use of the ephemeral gateway also facilitates the integration of multiple security related services, such as cloud based key management service, virtual private networks (VPNs), and certificate services, to create a comprehensive security solution that is more robust than using these services individually or only partially in combination.

The implementation of conditional access, including IP address restrictions and the requirement of an active VPN tunnel, adds an extra layer of security to the remote access process.

FIG. 1 is a block diagram illustrating a system 100 for providing remote access to assets in a secure manner. System 100 includes a data center 110 that may include one or more user isolated networks 115 that provide cloud services. In one example, the user may be part of an organization, company, or other entity that may have one or more users on a remote user network 120. The remote users may be people or processes needing access to assets, such as data and services that are provided by the data center 110.

The data and services may be owned by of contracted for the use of the organization of which the user is an employee or otherwise associated with organization.

In one example, the remote user may request access to their corresponding user isolated network 115 on data center 110 to access the assets. Rather than providing direct access via an established account, the request may specify a particular access time window 125 during which access is desired. Prior to the occurrence of the access time window 125, an ephemeral gateway 130 may be established on a separate host 135, such as Microsoft Azure. Host 135 connects to the remote user network 120 via connection 140 and to the user isolated network 115 via connection 145. In one example, connection 145 may be a VPN to further enhance security. Time limited credentials, such as a user name and password may also be generated and used to access the ephemeral gateway 130 and hence the user isolated network 115 during access time window 125. The user isolated network may include multiple cloud services, all of which may be accessed via the ephemeral gateway.

At the conclusion of the time window, the ephemeral gateway is decommissioned or otherwise deleted, removing the ability to access the user isolated network 115. Each new access time window for the user results in a new ephemeral gateway 130 being instantiated and decommissioned, along with new corresponding time limited credentials. Other users requiring access may also request access in a similar manner to their resources hosted by data center 110, with each approved request resulting in separate ephemeral gateways and ephemeral credentials.

In one example, a user may work with either an operations department or a privileged access scheduler 132 (calendar function) in host 135 to set up a remote access time window. An example remote access time window may identify the date and time requested for access as Tuesday, Jun. 6, 2023, from 1:00 pm-4:00 pm (local time). The user may also identify the particular need for access, such as: "As an engineer I will need access from my office to a jump box to connect to a high valued host in the Cloud. Once I (the consumer of the security appliance) land on the jump box I can pivot to my high valued host(s) living in Cloud or on premises in Microsoft's critical environment."

A simple basic security handshake may be required to set up a calendar appointment between the ephemeral gateway/ jump box, its credentials calendar, and the privileged user (consumer of the remote access). The ephemeral gateway may be used with or incorporate further security monitoring services, such as Microsoft Azure Sec Pack or similar monitoring clients like Defender for Endpoint and security monitoring systems for intrusion detection. Security logging and alerting may also be utilized, along with the use of virtual private network tunnels between the ephemeral gateway and a data center hosting the cloud resources and access control lists to limit access to listed IP addresses.

Once the calendar appointment is approved in accordance with desired security checks, an hour (or two) prior to the start time (aka 11:00 am in the above example), the calendar function will spin up a task to mint or instantiate a brand new ephemeral gateway using infrastructure as code, and will spin up a set of ephemeral credentials in a Cloud based key management service, such as Microsoft Azure Key Vault, that will only be good for the time window that the original calendar entry specifies. With an ephemeral nature, at the end of the scheduled time window, the ephemeral gateway will be deleted, and its associated ephemeral credentials will be deleted and will not be able to be used again. The scheduler or calendar function will notify the host 135 to shut down the ephemeral gateway 130 at the end of the time window.

The use of the ephemeral gateway alone or in conjunction with additional security services, individually or as a collection of services, working in orchestration delivers solid security. The use of the ephemeral gateway spinning up a limited time window and the short-lived credentials provide enhanced security and reduce the risk of attack. When time is up from the scheduler, then all objects related to the ephemeral gateway and credentials may be deleted.

By not allowing an attacker to get a persistent bridge head or a foothold on the ephemeral gateway due to its limited time existence, the remote access deters opportunistic attack and at least slows determined attacks, driving the cost or the investment of the attack to an almost prohibitive level.

Figure 2:
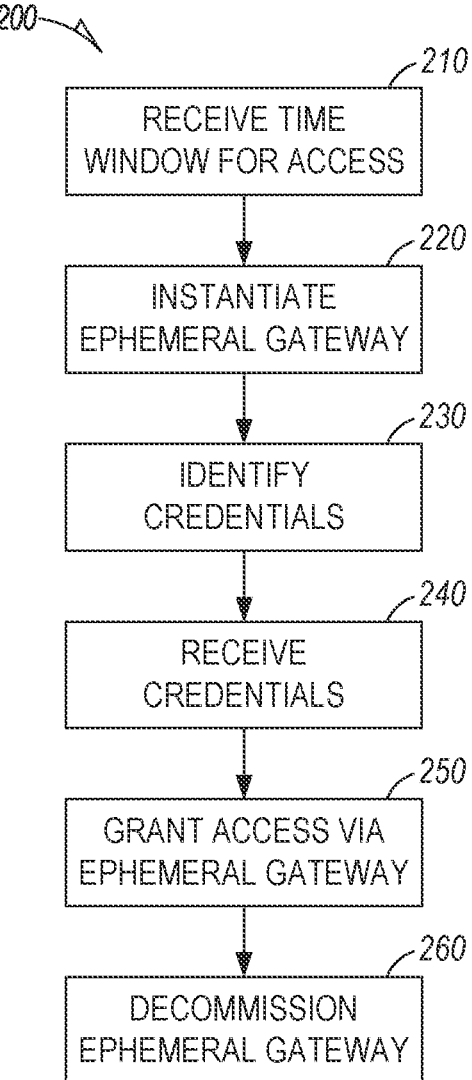
FIG. 2 is a flowchart illustrating a computer implemented method for providing remote access by a first remote user to computing resources according to an example embodiment.

FIG. 2 is a flowchart illustrating a computer implemented method 200 for providing remote access by a first remote user to computing resources. Method 200 begins at operation 210 by receiving a request for a time window for allowing access to an asset in a local area network. The time window may be requested by the first remote user via a privileged access calendar function or by contacting an administrator and providing details regarding the time at which the time window should begin and the length of time access is desired.

Upon approval of the request, an ephemeral gateway to provide access to the asset during the time window, is instantiated at operation 220. In one example, the ephemeral gateway is a jump box or other gateway that can be provisioned and decommission on demand.

Operation 230 identifies time window limited access credentials required for the first remote user to access the ephemeral gateway to gain access to the asset only during the time window. The ephemeral gateway is initiated at a time prior to or at the beginning of the time window and removed at an end of the time window.

The limited access credentials may be provided to the first remote user via secure communications. In one example, the time window limited access credentials may be provided to the first remote user via a calendar invite in response to the request via the privileged access calendar function. The credentials are specific to the time window and are only valid during the time window. The time window limited access credentials may be stored in a cloud-based password management vault accessible by the remote use to aid in accessing the assets. The ephemeral gateway instantiation or provisioning may also be performed via the privileged access calendar.

Method 200 may continue at operation 240 by receiving the time window limited credentials from the first remote user. At operation 250, access is granted to the asset, only via the ephemeral gateway, in response to receiving the time window limited credentials within the time window and verifying their authenticity. Two factor authentication may be used in some examples as well as other verification methods to further enhance security.

In one example, granting access to the asset comprises establishing a virtual private network tunnel between the ephemeral gateway and the local area network. Certificate services may be used to establish the virtual private network. In one example, granting access to the asset is only done in response to an IP address of the remote user being included in a list of permitted IP addresses.

Once the end of the time window has been reached, operation 260 decommissions or deletes the ephemeral gateway and the credentials. If the remote user desires more remote access, the remote user may generate another request, specifying a future time window, which may be received at operation 210 resulting in a new ephemeral gateway being instantiated with new remote user credentials. The limited duration of the ephemeral gateway makes it difficult for attackers to gain a foothold in a data center hosing the cloud resources. Once the time slot is over, the ephemeral gateway box is deleted, removing any potential unauthorized access points and the corresponding ability to continue further attacks.

In one example, the local area network is a cloud computing network operating in a data center. The local area network may be provisioned for multiple remote users. The ephemeral gateway limits the first remote user access to the asset or assets associated with the first remote user.

Figure 3:
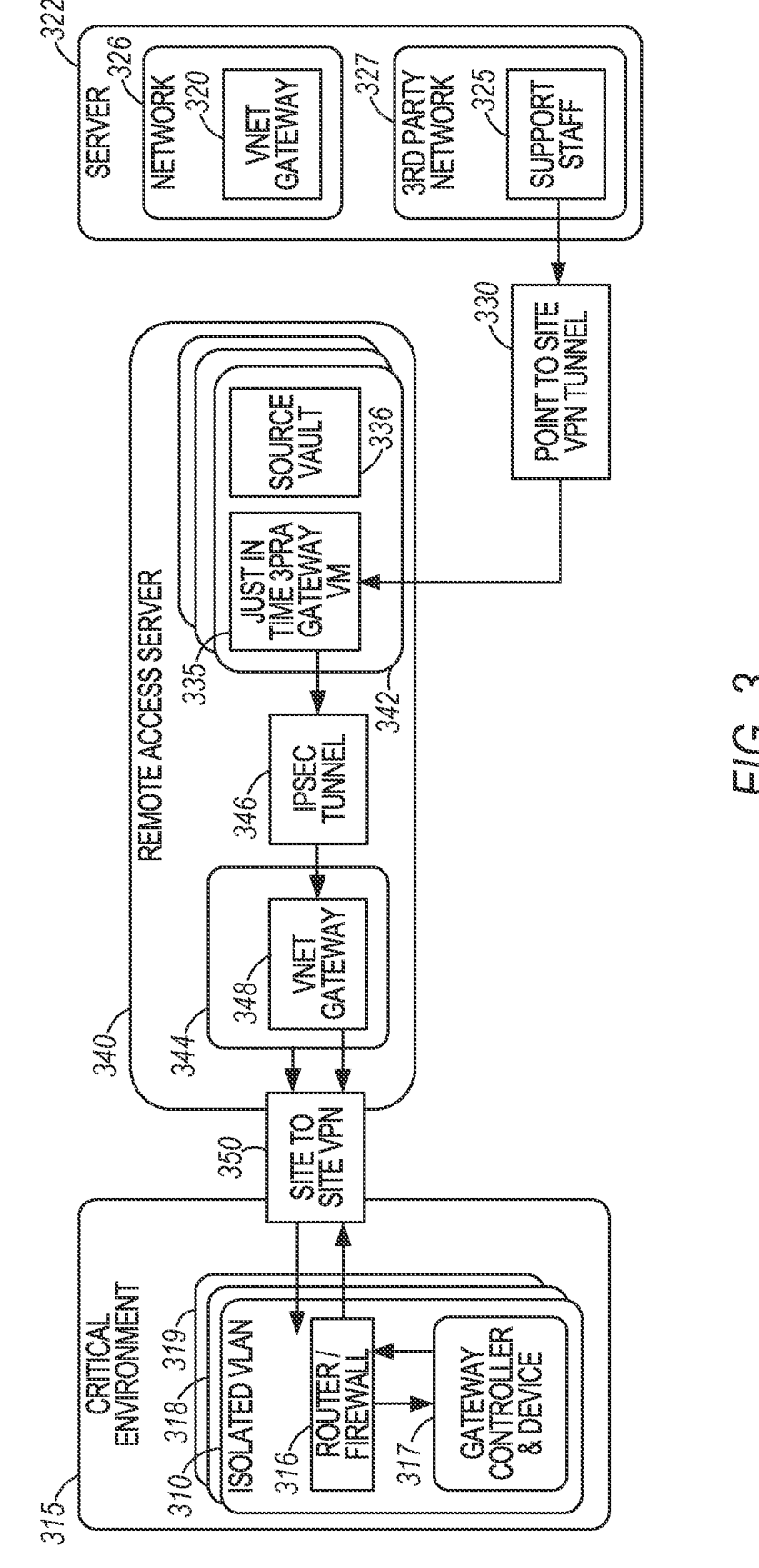
FIG. 3 is a detailed block diagram of a system for setting up secure remote access to remote computing assets according to an example embodiment.

FIG. 3 is a detailed block diagram of a system 300 for setting up secure remote access to remote computing assets. In one example, the remote assets include an isolated virtual local area network 310 hosted in a critical environment 315. The remote assets may include a data, devices, software and other assets, such as a third-party edge solution as well as a router/firewall 316 and gateway/controller and device in an isolated network 317. The assets may be more sensitive that other data and assets in one example. The critical environment 315 may hosted in a data center that provides multiple isolated virtual local networks 318, 319 for different third parties that each need to be secure from access by unauthorized parties.

Remote access to the isolated virtual local area network 310 is provided to a third-party user device 320 on a third-party server 322. In one example, access for a selected window of time may be requested of support staff 325 which may be on a same third-party network 326 or a different third-party network 327. The support staff may perform some checks to ensure that a person using the user device 320 should be allowed to access the assets in the critical environment 315. If the user device 320 should be allowed, the support staff 325 may request via a secure connection 330, such as a point to site virtual private network tunnel, that an ephemeral gateway 335 be created in a remote access server 340. The remote access server 340 is in a separate network that is connected via secure connection 330.

The ephemeral gateway 335 may also be referred to as a just in time PRA (probabilistic risk assessment) gateway virtual machine. Credentials may be generated as part of the creation of the ephemeral gateway 335 and stored in a secure vault 336 and communicated back to the user device 320. The remote access server 340 may be divided into separate virtual networks 342 and 344. Network 342 contains the ephemeral gateway 335 and is used to connect to the server 322 and user device in the third-party network 326.

An IP secure tunnel 346 may be used to connect between networks 342 and 344. Network 344 is used to connect to the critical environment 315 via a virtual network gateway 348 and a site-to-site virtual private network 350.

Figure 4:
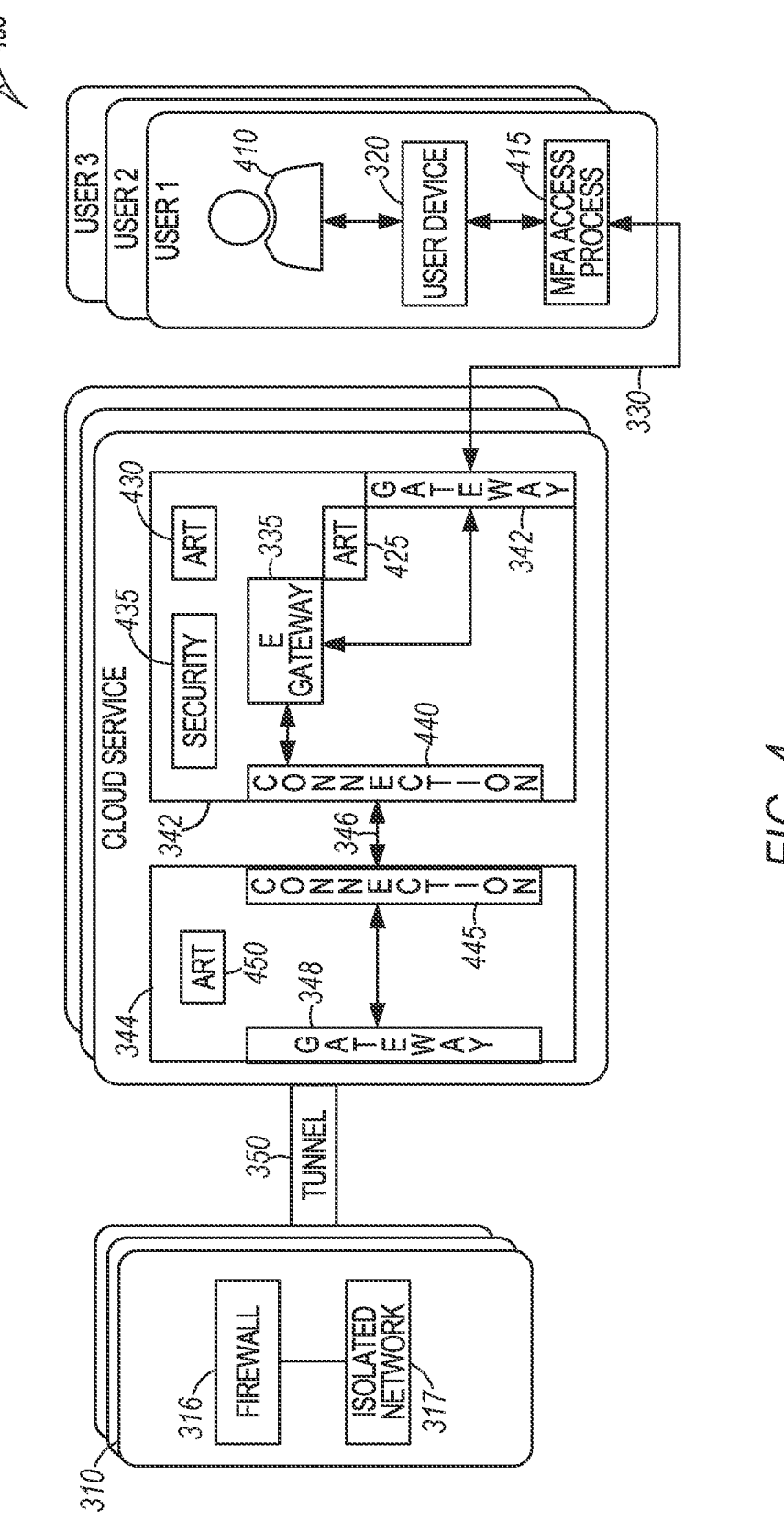
FIG. 4 is a block diagram illustrating a system for access to assets in the isolated network according to an example embodiment.

FIG. 4 is a block diagram 400 illustrating a system for access to assets in the isolated network 317 provided once the ephemeral gateway 335 has been established and a current time is within the specified time window of the ephemeral gateway 335. A user 410 may use user device 320 to access the isolated network 317 using the credentials in the vault 336 via a multifactor access process 415. Secure connection 330 is coupled to a gateway 420 to gain access to the ephemeral gateway 335.

An outside access route table 425 may be used to ensure a user device IP address is permitted to access the ephemeral gateway 335. In one example additional security functions

435 may be used to provide additional security checking. An inside access route table 430 may be used to obtain the IP address for connecting to the network 344 via a connection 440, tunnel 346, and a connection 445. A critical environment access route table 450 may be used to establish a connection via critical environment 315 access gates 348 to tunnel 350, providing access to the isolated virtual local area network 310 in the critical environment 315 via firewall 316. Access is then provided to the isolated network 317.

Figure 5:
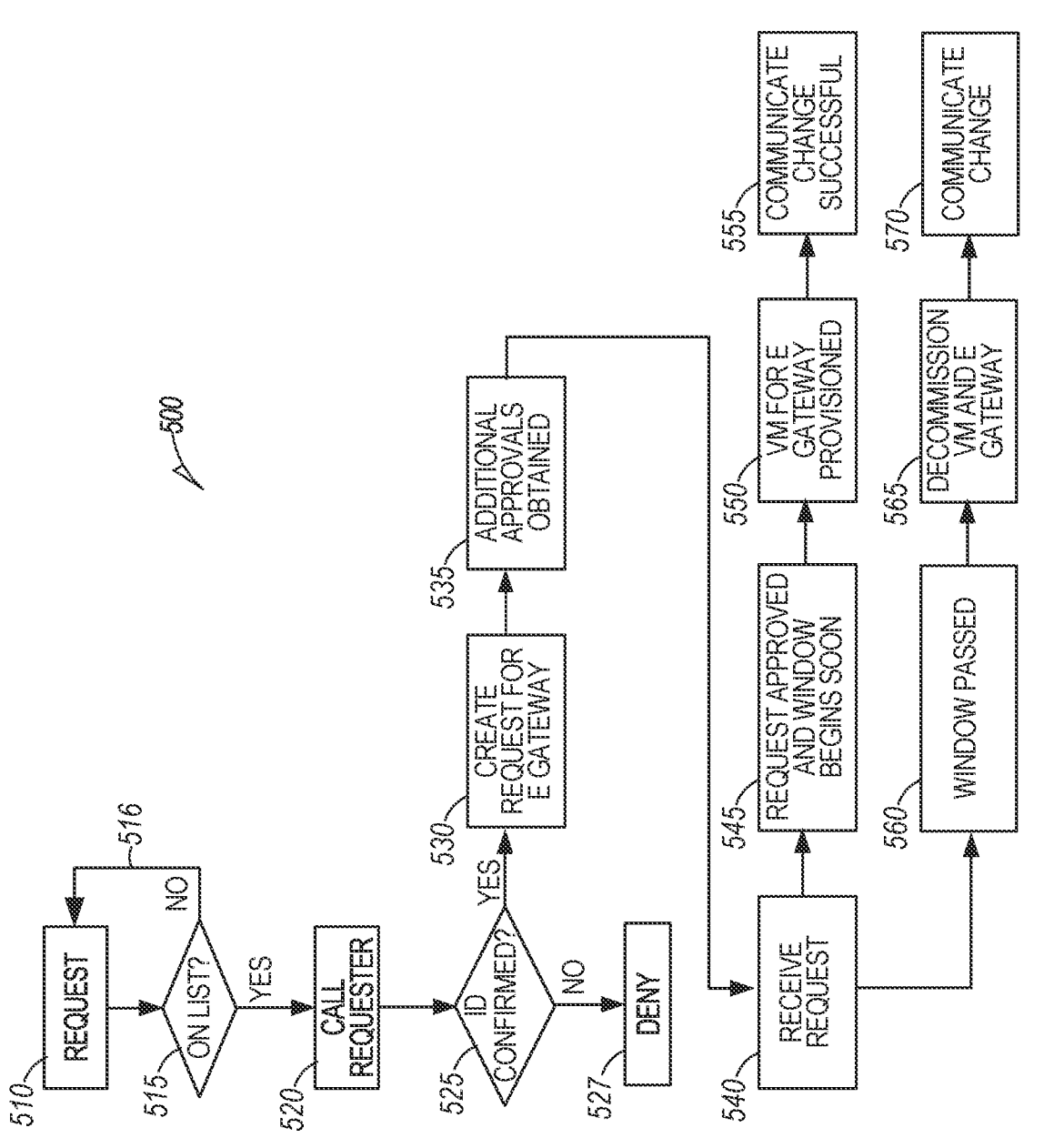
FIG. 5 is a detailed flowchart illustrating a method of establishing and using an ephemeral gateway to remotely and securely access computing services and data stored in a secure network environment according to an example embodiment.

FIG. 5 is a detailed flowchart illustrating a method 500 of establishing and using an ephemeral gateway to remotely and securely access computing services and data stored in a secure network environment, such as a data center. Method 500 begins at operation 510 by a user generated a request to access assets, such as data or services in a separate, secure, network. The request may include a reason why the user needs access and also specifies a particular time window during which access is desired.

The user may be an employee or member of an organization, such as a vendor in one example. The organization may have their own network along with network administrators or help desk type people or functions that receive the request, such as via email. At operation 515, the request is received. Information in the request, such as a user ID is compared to list of user IDs that have been approved for accessing the assets. If the user is not on the list, the user may be informed of such as indicated at 516. If the user is on the list, a call may be made to the user submitting the request at operation 520 to confirm that the user actually sent the request. At decision operation 525, if the request is not confirmed, the request will be denied at 527. If approved, further optional approvals of various management or other functions of the organization may also be sought. Once finally approved, a change request may be generated at operation 530. The change request is a request for generation of a ephemeral gateway to be active during the requested time window to allow the user to access the assets. This change request may also be optionally routed at operation 535 for further approvals within the organization as desired.

Once final approvals have been received, the change request is routed to a remote access server and received at operation 540. Shortly before the window begins, at operation 545, preparations begin for generating the ephemeral gateway at operation 550. In one example, the provisioning may begin about one-half hour prior to the beginning of the window to ensure the ephemeral gateway is operable at the time of the beginning of the window. Provisioning may begin at different times for different systems.

A virtual machine may be spun up to house the ephemeral gateway at operation 550. Once created, a communication may be generated at operation 555 to communicate the completion of ephemeral gateway and communicate the associated credentials to the user.

At the expiration of the time window as indicated at operation 560, the ephemeral gateway and virtual machine may be decommissioned at operation 565 such that it can no longer be used to access the assets. The completion of the decommissioning may be communicated back to the user and network administrators at operation 570.

In one example, operation 540 is the entry into a set of tools on the remote access server that are responsible for creating and managing the creation and decommissioning of ephemeral gateways for each approved change request.

Figure 6:
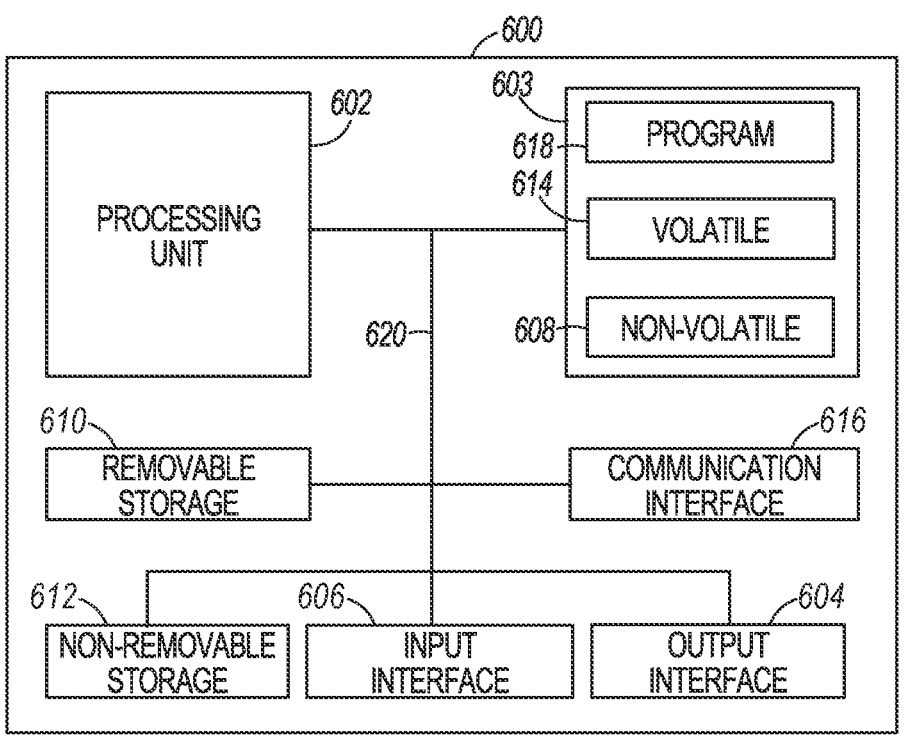
FIG. 6 is a block schematic diagram of a computer system to implement one or more example embodiments.

FIG. 6 is a block schematic diagram of a computer 600 to implement one or more servers and devices for providing secure remote access to computing assets and for performing methods and algorithms according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a machine-readable or computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method includes receiving a time window for allowing access to an asset in a local area network. An ephemeral gateway is instantiated to provide access to the asset during the time window. Time window limited access credentials are also identified and are required for a first remote user to access the ephemeral gateway to gain access to the asset only during the time window.

2. The method of example 1 wherein selecting a time window is performed via a privileged access calendar function.

3. The method of example 2 comprising providing the first remote user the time window limited access credentials via a calendar invite.

4. The method of example 3 wherein the credentials are specific to the time window and are only valid during the time window.

5. The method of any of examples 2-4 wherein instantiating the ephemeral gateway is performed via the privileged access calendar.

6. The method of any of examples 1-5 wherein the ephemeral gateway is initiated at a time prior to a beginning of the time window and removed at an end of the time window.

7. The method of any of examples 1-6 and further including receiving the time window limited credentials from the first remote user and granting access to the asset in response to receiving the time window limited credentials within the time window.

8. The method of example 7 wherein granting access to the asset comprises establishing a virtual private network tunnel between the ephemeral gateway and the local area network.

9. The method of example 8 wherein certificate services are used to establish the virtual private network.

10. The method of any of examples 7-9 wherein granting access to the asset is only done in response to an IP address of the remote user being included in a list of permitted JP addresses.

11. The method of any of examples 1-10 wherein the time window limited access credentials are stored in a cloud-based password management vault.

12. The method of any of examples 1-11 wherein the ephemeral gateway comprises a jump box.

13. The method of any of examples 1-12 wherein the local area network comprises a cloud computing network provisioned for multiple remote users and wherein the ephemeral gateway limits the first remote user access to the asset associated with the first remote user.

14. A machine-readable storage device having instructions for execution by a processor of a machine to cause the processor to perform operations to perform any of the methods of examples 1-13.

15. A device includes a processor and a memory device coupled to the processor and having a program stored thereon for execution by the processor to perform operations to perform any of the methods of examples 1-13.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   receiving a time window for allowing access by a first remote user to an asset in a local area network;
   instantiating an ephemeral gateway in response to receiving the time window to provide access to the asset during the time window; and
   identifying time window limited access credentials required for the first remote user to access the ephemeral gateway to gain access to the asset only during the time window.

2. The method of claim 1 wherein selecting a time window is performed via a privileged access calendar function.

3. The method of claim 2 comprising providing the first remote user the time window limited access credentials via a calendar invite.

4. The method of claim 3 wherein the credentials are specific to the time window and are only valid during the time window.

5. The method of claim 2 wherein instantiating the ephemeral gateway is performed via the privileged access calendar.

6. The method of claim 1 wherein the ephemeral gateway is initiated at a time prior to or at a beginning of the time window and removed at or after an end of the time window to reduce risk of attack, and wherein the credentials are only valid during the time window.

7. The method of claim 1 and further comprising:
   receiving the time window limited credentials from the first remote user; and
   granting access to the asset in response to receiving the time window limited credentials within the time window.

8. The method of claim 7 wherein granting access to the asset comprises establishing a virtual private network tunnel between the ephemeral gateway and the local area network.

9. The method of claim 8 wherein certificate services are used to establish the virtual private network.

10. The method of claim 7 wherein granting access to the asset is only done in response to an IP address of the remote user being included in a list of permitted IP addresses.

11. The method of claim 1 wherein the time window limited access credentials are stored in a cloud-based password management vault.

12. The method of claim 1 wherein the ephemeral gateway comprises a jump box.

13. The method of claim 1 wherein the local area network comprises a cloud computing network provisioned for multiple remote users and wherein the ephemeral gateway limits the first remote user access to the asset associated with the first remote user.

14. A machine-readable storage device having instructions for execution by a processor of a machine to cause the processor to perform operations to perform a method, the operations comprising:
   receiving a time window for allowing access by a first remote user to an asset in a local area network;
   instantiating an ephemeral gateway in response to receiving the time window to provide access to the asset during the time window; and
   identifying time window limited access credentials required for the first remote user to access the ephemeral gateway to gain access to the asset only during the time window.

15. The device of claim 14 wherein selecting a time window is performed via a privileged access calendar function and providing the first remote user the time window limited access credentials via a calendar invite.

16. The device of claim 14 wherein the ephemeral gateway is initiated at a time prior to or at a beginning of the time window and removed at or after an end of the time window to reduce risk of attack, and wherein the credentials are only valid during the time window.

17. The device of claim 14 wherein the operation further comprise:

receiving the time window limited credentials from the first remote user; and granting access to the asset in response to receiving the time window limited credentials within the time window.

18. The device of claim 17 wherein granting access to the asset comprises establishing a virtual private network tunnel between the ephemeral gateway and the local area network and wherein granting access to the asset is only done in response to an IP address of the remote user being included in a list of permitted IP addresses.

19. A device comprising:

a processor; and a memory device coupled to the processor and having a program stored thereon for execution by the processor to perform operations comprising:

receiving a time window for allowing access by a first remote user to an asset in a local area network;

instantiating an ephemeral gateway in response to receiving the time window to provide access to the asset during the time window; and identifying time window limited access credentials required for the first remote user to access the ephemeral gateway to gain access to the asset only during the time window.

20. The device of claim 19 wherein the operation further comprise:

receiving the time window limited credentials from the first remote user; and granting access to the asset in response to receiving the time window limited credentials within the time window.

*    *    *    *    *